United States Patent [19]

Kimura

[11] 4,357,834
[45] Nov. 9, 1982

[54] DISPLACEMENT CONVERTER

[75] Inventor: Atsushi Kimura, Yokohama, Japan

[73] Assignee: Hokushin Electric Works, Ltd., Tokyo, Japan

[21] Appl. No.: 183,631

[22] Filed: Sep. 3, 1980

[51] Int. Cl.³ .................................................. G01L 19/04
[52] U.S. Cl. ...................................... 73/708; 73/706; 73/718; 73/724; 331/65; 361/283
[58] Field of Search ................. 73/706, 724, 718, 708; 331/65; 361/283

[56] References Cited

U.S. PATENT DOCUMENTS

| | | | |
|---|---|---|---|
| 3,858,097 | 12/1974 | Polye | 361/283 |
| 3,952,234 | 4/1976 | Birchall | 73/724 |
| 4,227,419 | 10/1980 | Park | 73/724 |
| 4,272,822 | 6/1981 | Yasuhara | 73/718 |
| 4,289,035 | 9/1981 | Lee | 73/718 |

Primary Examiner—Donald O. Woodiel
Attorney, Agent, or Firm—Michael Ebert

[57] ABSTRACT

A displacement converter useful for pressure gauges and similar instruments, the converter including a displacement detector provided with a variable capacitor responsive to the displacement to be metered and a fixed capacitor insensitive thereto. Also included is an amplitude-controllable oscillator whose AC output is applied to both capacitors, means being coupled to the capacitors to derive therefrom electrical signals which are a function of their capacitance values. These electrical signals are fed to a control circuit to produce a control signal corresponding to the difference therebetween, the control signal being applied to the oscillator to govern the output amplitude thereof in a manner maintaining the control signal at a constant value.

7 Claims, 5 Drawing Figures

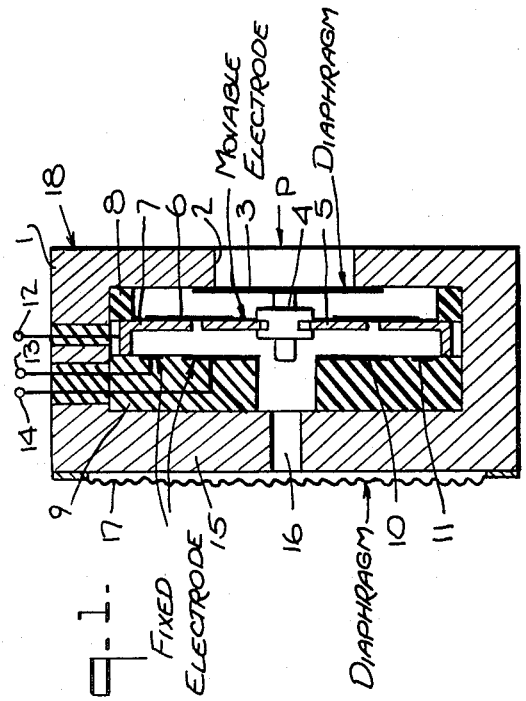
Fig. 1.
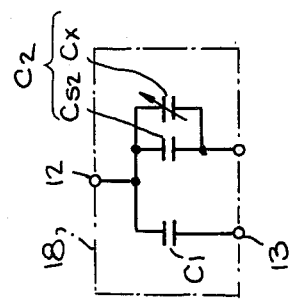
Fig. 2.
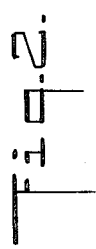
Fig. 3.
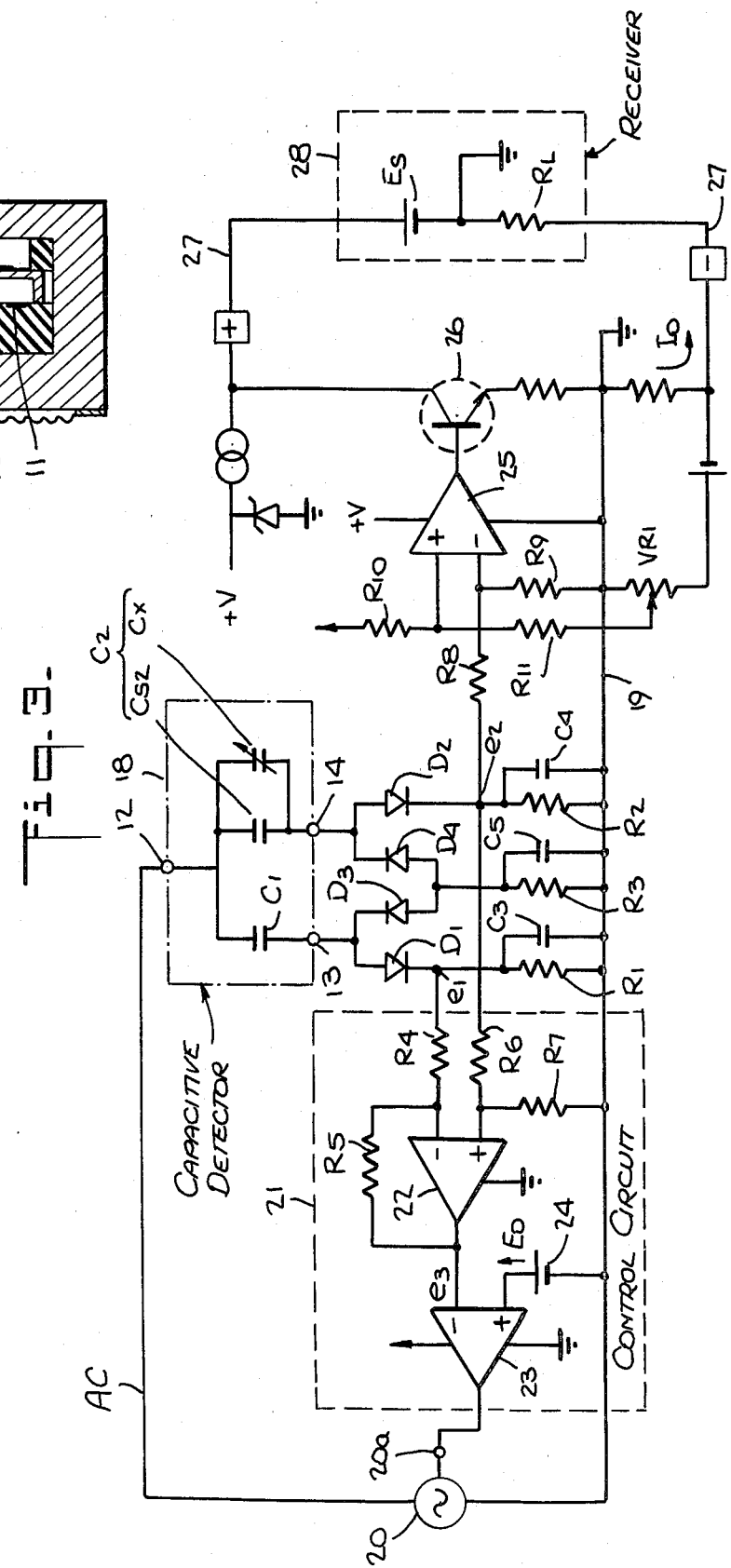

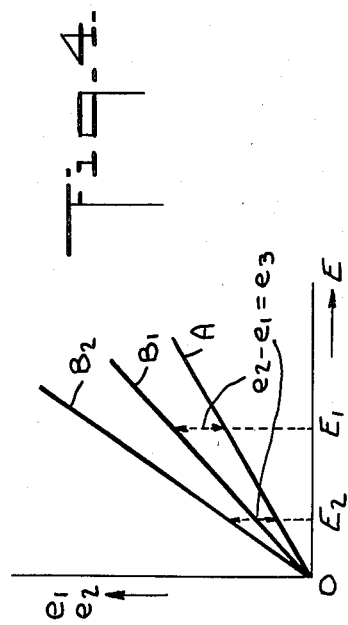
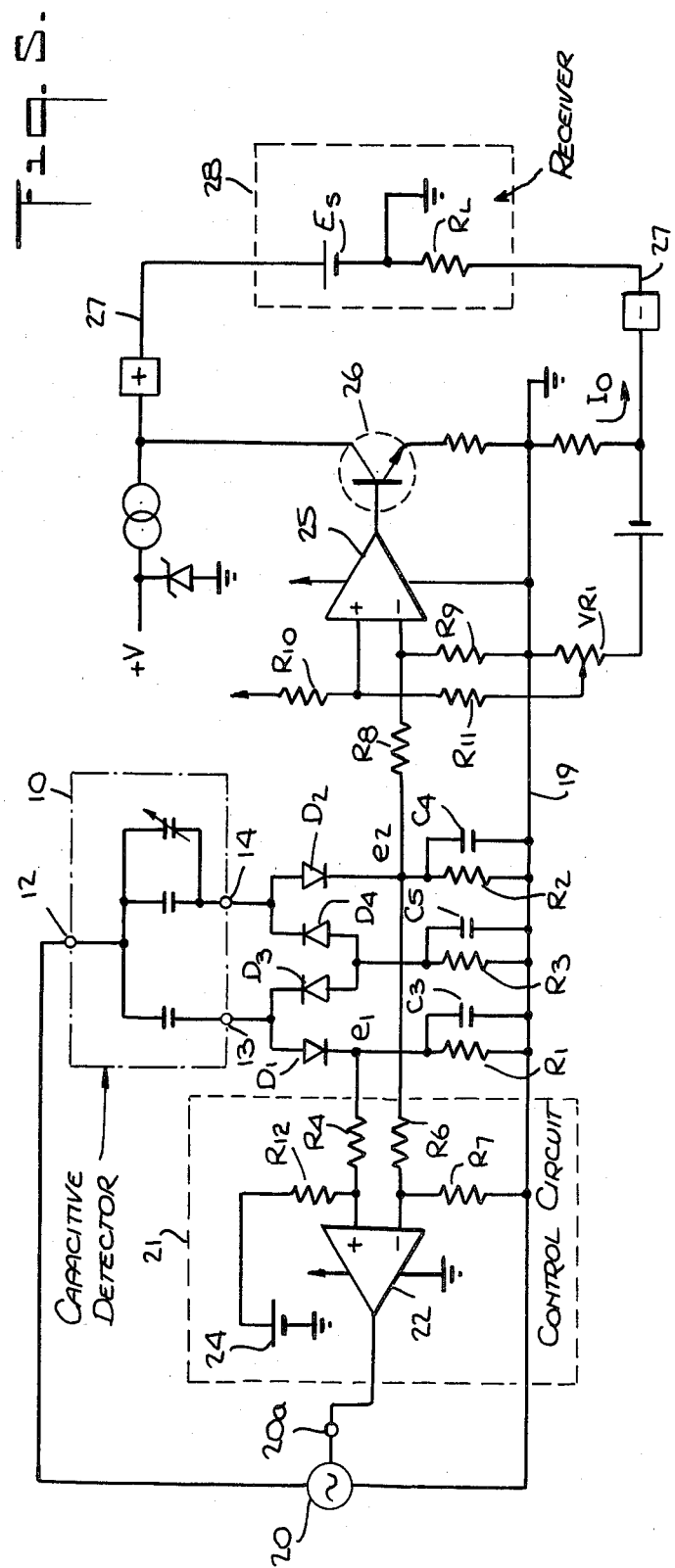

DISPLACEMENT CONVERTER

BACKGROUND OF INVENTION

This invention relates to displacement converters which are useful in pressure gauges or similar instruments, and more particularly to a displacement converter which includes a displacement detector of simplified construction, making it possible to produce a low cost pressure gauge. A displacement converter in accordance with the invention corrects for nonlinearities in the displacement detection signal resulting from its simplified structure to yield a linearized electrical signal.

Capacitive-type displacement detectors have heretofore been used in pressure gauges. In a conventional capacitive-type displacement detector, diaphragms are provided as pressure-sensing elements at both ends of a cylindrical container, a coupling shaft being bridged between these diaphragms. A movable electrode is supported on the coupling shaft at the center thereof, with fixed electrodes insulated from the container mounted on opposing sides of the movable electrode. An electrical signal is generated which corresponds to the difference in the capacitance values between the movable electrode and each of the fixed electrodes, thereby indicating the difference between the respective pressures applied to the sensing diaphragms.

In other words, the conventional capacitive-type displacement detector is constructed and functions as a differential pressure gauge. Even if one wishes merely to measure the pressure of a gas or a liquid, use must be made of a displacement detector having a differential pressure construction. A capacitive-type displacement detector of differential pressure construction is structurally complicated and costly, and therefore represents an uneconomical approach for merely measuring pressure.

While it is possible to simplify the structure of a capacitive-type displacement detector and thereby reduce its cost, a simplified detector structure, as will later be explained, exhibits a non-linear relationship between the applied pressure and the resultant electrical signal so that the output thereof is not an accurate representation of pressure.

SUMMARY OF INVENTION

In view of the foregoing, the main object of this invention is to provide a displacement converter comprising a capacitive-type displacement detector and an electronic system associated therewith which generates an electrical signal that undergoes a linear change in response to variations in pressure.

Briefly stated, this object is accomplished in a displacement converter including a capacitive-type displacement detector having a variable capacitor responsive to the displacement to be metered and a fixed capacitor which is insensitive thereto. The associated electronic system includes an oscillator whose A-C output signal is applied to both the variable and the fixed capacitors.

The system further includes means to detect electrical signals corresponding to the respective capacitance values of the variable and fixed capacitors. Also provided is a control circuit in which the difference between these electrical signals is determined to produce a control signal which acts to govern the amplitude of the oscillator in a manner maintaining the control signal at a constant value.

OUTLINE OF DRAWINGS

For a better understanding of the invention as well as other objects and further features thereof, reference is made to the following detailed description to be read in conjunction with the accompanying drawings, wherein:

FIG. 1 is a sectional view of a preferred embodiment of a capacitive type displacement detector in accordance with the invention;

FIG. 2 is the equivalent electrical circuit of the detector;

FIG. 3 is the schematic circuit diagram of an electronic system in accordance with the invention associated with the capacitive type displacement detector;

FIG. 4 is a graph explanatory of the operation of the system; and

FIG. 5 is a schematic circuit diagram of another electronic system in accordance with the invention.

DESCRIPTION OF INVENTION

In the capacitive-type displacement detector shown in FIG. 1, the cylindrical container 1 has a hole at one end thereof covered by a pressure-sensing membrane or diaphragm 3. A movable electrode 5 of annular form is attached at its center to diaphragm 3 through a coupling shaft 4. The periphery of movable electrode 5 is supported by a metal ring 7 by means of an annular flat spring member 6.

Metal ring 7 is held between insulators 8 and 9 within container 1 in a manner insulating the ring therefrom. Deposited on the surface of insulator 9 are fixed electrodes 10 and 11, the fixed electrodes being coated on those areas which face the movable electrode 5 and metal ring 7. Fixed electrode 10 has an annular form, its perimeter being extended to face metal ring 7. Fixed electrode 11 is also made annular and is concentric with the fixed electrode 10. Fixed electrode 11 faces only metal ring 7. Metal ring 7, fixed electrode 10 and fixed electrode 11 have lead wires connected thereto which are led out of container 1 for connection with terminals 12, 13 and 14.

A through hole 16 is formed in insulator 9 and in the opposing end piece 15 of container 1. A diaphragm 17 is stretched over the exterior of end piece 15. A liquid such as silicone oil is sealed within the space defined between the plane including movable electrode 5 and metal ring 7 and the plane including electrodes 10 and 11. This space communicates by way of through hole 16 with the space defined between diaphragm 17 and end piece 15 of container 1. In this way, variations in the volume of the space in container 1 caused by movement of the movable electrode 5 may be absorbed by the expansion and contraction of diaphragm 17. Furthermore, variations in volume resulting from the expansion and contraction of the sealed liquid caused by a temperature changes are compensated for in this arrangement.

In this displacement detector arrangement, the initial gap between movable electrode 5 and fixed electrode 10 can easily be adjusted to satisfy instrument requirements. On the other hand, in the conventional differential capacitive-type displacement detector, since two fixed electrodes are disposed on opposite sides of a movable electrode, an adjustment of the gap between one fixed electrode and the movable electrode causes a change in the gap between the other fixed electrode and the movable electrode. It therefore becomes necessary to fabricate the various parts of the differential capacitive-type displacement detector with precision so that the movable electrode is disposed exactly midway between the fixed electrodes. This inevitably increases the manufacturing costs for each part, and makes the displacement detector more expensive.

In contradistinction, the displacement detector illustrated in FIG. 1 is of simple construction and is easy to manufacture and adjust; hence it is relatively inexpensive.

FIG. 2 schematically shows the capacitors formed between movable electrode 5, metal ring 7 and fixed electrodes 10 and 11 in the displacement detector illustrated structurally in FIG. 1. Reference character $C_1$ indicates a fixed capacitor formed between metal ring 7 and fixed electrode 11, and $C_2$ designates a variable capacitor formed between movable electrode 5, metal ring 7 and fixed electrode 10. Variable capacitance $C_2$ is composed of a parallel circuit of a variable capacitor $C_x$ formed between movable electrode 5 and fixed electrode 10 and a fixed capacitor $C_{S2}$ formed between metal ring 7 and fixed electrode 10.

We shall assume that $C_0$ represents the area over which electrodes 5 and 10 face each other and $d_0$ represents the initial gap between the movable electrode and fixed electrode 10. Now, assuming that movable electrode 5 is displaced by $\Delta d$ when a pressure P is applied to the pressure-sensing membrane 3, it follows that:

$$C_1 = C_0 \quad (1)$$

$$C_2 = C_0 + C_0[d_0/(d_0 - \Delta d)] \quad (2)$$

Accordingly, if we generate an electrical signal representing the difference between capacitance $C_0$ of fixed capacitor $C_1$ and capacitance $C_0 + C_0[d_0/(d_0 - \Delta d)]$ of variable capacitor $C_2$, this electrical signal will vary with $C_0[d_0(d_0 - \Delta d)]$. As a consequence, the relationship between pressure P and the resulting electrical output becomes nonlinear, thereby introducing an error in the readout.

In conjunction with a non-linear displacement detector of the type shown in FIG. 1, the present invention provides an associated electronic system to produce an electrical output which undergoes a linear change in response to a pressure variation.

The system of this purpose includes an oscillator for applying an AC signal to both fixed capacitor $C_1$ and variable capacitor $C_2$, and means for detecting the difference between signals derived from the fixed capacitor and the variable capacitor to provide a difference signal for governing the amplitude of the oscillator output so that the difference signal may be maintained constant at all times.

By controlling the amplitude of the oscillator output which applies the AC signals to fixed capacitor $C_1$ and variable capacitor $C_2$ as described above, the amount of signal flowing in variable capacitor $C_2$ is corrected to vary in proportion to pressure P. By detecting the current flowing in capacitor $C_1$ or $C_2$, an electrical output can be obtained which varies linearly with the pressure P to be measured.

FIG. 3 is a circuit diagram of a preferred embodiment of an electronic system associated with a capacitive displacement detector in accordance with the present invention. Reference numeral 18 indicates the displacement detector described previously in connection with FIG. 1. Fixed capacitor $C_1$ is connected across terminals 12 and 13 and variable capacitor $C_2$ is connected across terminals 12 and 14 as described previously with regard to FIG. 2. Between terminal 13 of displacement detector 18 and a common potential point 19 there is connected a series circuit formed by a diode $D_1$ and a resistor $R_1$. Between terminal 14 and common potential point 19, there is connected a second series circuit formed by a diode $D_2$ and a resistor $R_2$.

The output of an oscillator 20 is connected between terminal 12 of the displacement detector 18 and common point 19, thereby applying an AC signal across capacitor $C_1$ in series with diode $D_1$ and resistor $R_1$ and also across capacitor $C_2$ in series with diode $D_2$ and resistor $R_2$.

As a consequence, the AC signals flowing respectively through fixed capacitor $C_1$ and variable capacitor $C_2$ are half-wave rectified by diodes $D_1$ and $D_2$ to develop DC voltages across resistors $R_1$ and $R_2$ proportional to the capacitance values thereof.

Diodes $D_3$ and $D_4$ which are opposite in polarity to diodes $D_1$ and $D_2$ are respectively connected at one end to terminals 13 and 14 of the displacement detector 18. The other ends of diodes $D_3$ and $D_4$ are connected together to common potential point 19 via a resistor $R_3$. The discharge circuit made up of diodes $D_3$ and $D_4$ and resistor $R_3$ acts to discharge charges stored in fixed capacitor $C_1$ and variable capacitor $C_2$ during each positive half cycle, thereby permitting half-wave rectified currents in the positive half cycle to flow in resistors $R_1$ and $R_2$. Capacitors $C_3$, $C_4$ and $C_5$ are respectively connected across resistors $R_1$, $R_2$ and $R_3$ to smooth half-wave rectified voltages developed across these resistors.

A control circuit 21 is provided which yields an electrical signal corresponding to a difference between the capacitances of fixed capacitor $C_1$ and variable capacitor $C_2$, the circuit acting to govern the amplitude of the oscillator 20 output so that the signal may always be held to a constant value. In this embodiment shown in FIG. 3, control circuit 21 comprises an operational amplifier 22 to whose inputs are applied the voltages developed across resistors $R_1$ and $R_2$, and an amplifier 23 for comparing the output from operational amplifier 22 with a reference voltage $E_0$.

The voltage developed across resistor $R_1$ is applied via a resistor $R_4$ to the inverting input terminal of operational amplifier 22, while the voltage developed across resistor $R_2$ is applied via a resistor $R_6$ to the non-inverting input terminal thereof. The non-inverting input terminal is connected via a resistor $R_7$ to common potential point 19. The output from operational amplifier 22 is negatively fed back to the inverting input terminal via a resistor $R_5$.

By selecting the resistance values of resistors $R_4$, $R_5$, $R_6$ and $R_7$ so that they are equal to one another, operational amplifier 22 functions as a subtractor having a gain of 1, a voltage corresponding to the difference between the voltages developed across resistors $R_1$ and $R_2$ being obtained at the amplifier output. This difference voltage is supplied to the inverting input terminal of amplifier 23 where it is compared with reference voltage $E_0$ taken from a reference voltage source 24. The output signal resulting from this comparison is applied to the amplitude-control terminal 20a of oscillator 20.

In this arrangement, the capacitance values of fixed capacitor $C_1$ and variable capacitor $C_2$ or the resistance values of resistors $R_1$ and $R_2$ are selected so that the difference between voltages $e_1$ and $e_2$ developed across resistors $R_1$ and $R_2$ in the initial state in which pressure P may be $e_2-e_1=e_3$ whereby $e_3=E_0$. When pressure P is applied to pressure-sensing membrane 3, the capacitance value of variable capacity $C_X$ of variable capacitor $C_2$ increases to cause an increase in the current value in resistor $R_2$, thereby raising voltage $e_2$ developed across resistor $R_2$. As a result of this action, the output potential of operational amplifier 22 deviates in the positive direction; that is to say, the output voltage $e_3$ from operational amplifier 22 rises by $e_3 + \Delta e$ in the positive direction.

As a consequence, the output from amplifier 23 becomes $-A\Delta e$ (A being the gain of amplifier 23) and deviates in the negative direction, and the controlled amplitude of the oscillator output 20 is reduced, thereby reducing the amplitude of AC signal applied between terminal 12 of the displacement detector and common potential point 19. As a further consequence, voltages $e_1$ and $e_2$ yielded by resistors $R_1$ and $R_2$ are lowered and the difference therebetween, $e_2-e_1=e_3$, becomes stable in the state in which $e_3=E_0$.

This operation will now be described in greater detail with reference to FIG. 4 where straight line A graphically represents the variation characteristic of voltage $e_1$ developed across resistor $R_1$ relative to output voltage E from oscillator 20. That is to say, voltage $e_1$ across resistor $R_1$ varies linearly at a constant gradient with output voltage E from oscillator 20. The straight line $B_1$ represents the variation characteristic of voltage $e_2$ developed across register $R_2$ relative to output voltage E from oscillator 20; while straight line $B_2$ shows the variation characteristic of voltage $e_2$ relative to output voltage E from oscillator 20 when a pressure is applied to the pressure-sensing membrane 3.

As will be appreciated from FIG. 4, when a pressure is applied to displacement detector 18, the variable capacitance $C_X$ of variable capacitor $C_2$ increases, so that if output voltage E from oscillator 20 remains unchanged, voltage $e_2$ yielded by resistor $R_2$ becomes higher and the gradient of its variation characteristic becomes steeper.

Letting $E_1$ represent the output voltage from oscillator 20 at which $e_2-e_1=e_3=E_0$ in the case of zero pressure applied to pressure-sensing membrane 3, when a pressure is applied thereto, difference voltage $e_2-e_1=e_3$ becomes equal to reference voltage $E_0$ at a voltage $E_2$ lower than output voltage $E_1$. In this way, by governing the output voltage of oscillator 20 so that the difference $e_2-e_1$ between fixed capacitor $C_1$ and variable capacitor $C_2$ may also be equal to reference voltage $E_0$, the DC voltages $e_1$ and $e_2$ yielded by resistors $R_1$ and $R_2$ then vary in proportion to the pressure applied to the displacement detector.

The reason for this is as follows: For convenience of explanation, let it be assumed that resistors $R_1$ and $R_2$ have the same resistance value $R_0$. Letting the voltages yielded by resistors $R_1$ and $R_2$ be represented by $e_1$ and $e_2$, respectively, these voltages $e_1$ and $e_2$ are each proportional to the product of the capacitance value of either fixed capacitor $C_1$ or variable capacitor $C_2$, the output voltage E from the oscillator and its angular frequency $\omega$ should the capacitive reactance of variable capacitor $C_2$ be large with respect to resistors $R_1$ and $R_2$. Accordingly, the following equations (3) and (4) hold true:

$$e_1 = \omega E C_1 R_0, \; e_2 = \omega E C_2 R_0 \quad (3)$$

$$\frac{e_1}{e_2 - e_1} = \frac{\omega E C_1 R_0}{\omega E R_0 (C_2 - C_1)} = \frac{C_1}{C_2 - C_1} \quad (4)$$

Substituting the relationships of the equations (1) and (2) into the equation (4), it follows that:

$$\frac{e_1}{e_2 - e_1} = \frac{C_0}{C_0 \frac{d_0}{d_0 - \Delta d}} = 1 - \frac{\Delta d}{d_0} \quad (5)$$

Utilizing the fact that the difference voltage, $e_2-e_1$, is governed so as to be a constant value $E_0$, equation (5) becomes as follows:

$$e_1 = E_0 \left(1 - \frac{\Delta d}{d_0}\right) \quad (6)$$

And from:

$$\frac{e_2}{e_2 - e_1} = 1 + \frac{e_1}{e_2 - e_1} = 2 - \frac{\Delta d}{d_0},$$

it follows that:

$$e_2 = E_0 \left(2 - \frac{\Delta d}{d_0}\right) \quad (7)$$

From equations (6) and (7), it will be seen that voltage $e_1$ or $e_2$ is in direct proportion to the displacement $\Delta d$ of moving electrode 5.

In the above, for convenience of description, use is made of the condition, $$\frac{1}{j\omega C_1}, \frac{1}{j\omega C_2} >> R_0,$$

but in the actual circuit arrangement, such a condition cannot be satisfied. Strictly speaking, voltage $e_1$ is not entirely in proportion to the displacement $\Delta d$ linearly as follows:

$$\frac{e_1}{e_2 - e_1} = \frac{C_1}{C_2 \sqrt{\frac{4 + (\omega R C_1)^2}{4 + (\omega R C_2)^2}} - C_1} \quad (8)$$

It is evident that if the above-noted condition is satisfied, this equation becomes $$\frac{e_1}{e_2 - e_1} = \frac{C_1}{C_2 - C_1} = \left(1 - \frac{\Delta d}{d_0}\right).$$

In the case where $f=50$ KHz, $R=40$ K$\Omega$, $C_1=100$ PF, $C_2=100$ $$\left(1 + \frac{d_1}{d_0 - \Delta d}\right) PF, \; d_0 = 0.3 \text{ mm}$$

and $\Delta d = 0 \sim 0.1$ mm, the above-noted voltage becomes nonlinear by 0.85%.

A signal linearly proportional to the displacement $\Delta d$ can be obtained by various methods. Use may, for example, be made of the following method:

Assuming the condition, $R_1 = R_2 = R_0$ is $R_1 = R_0$, and that $R_2 + (1-\alpha)R_0$, it follows that:

$$\frac{e_1}{e_2 - e_1} = \frac{(1-\alpha)C_1}{C_2\sqrt{\frac{4 = (1-\alpha)^2(\omega RC_1)^2}{4 + (\omega RC_2)^2}} - (1-\alpha)C_1} \quad (9)$$

By determining the value of $\alpha$ arbitrarily, the value of nonlinearity can be changed.

The relationship between $\alpha$ by the above-noted constants and the nonlinearity becomes, for example, as follows:

|                | nonlinearity |
|----------------|--------------|
| $\alpha = 0$   | 0.85%        |
| $\alpha = 0.1$ | 0.17%        |
| $\alpha = 0.2$ | −0.40%       |

Moreover, the nonlinearity can readily be corrected by performing a correction after division into $e_1 = e_1$ ($0 < \beta < 1$).

In the embodiment of the electronic system illustrated in FIG. 3, voltage $e_2$ induced in resistor $R_2$ is applied via resistor $R_8$ to an inverting input terminal of an operational amplifier 25 to control a transistor 26 connected to the output side of operational amplifier 25, by which the current $I_0$ flowing through a two-wire transmission line 27—27 is changed to develop a voltage proportional to pressure in the receiving resistor RL of a receiver 28 provided at a station remote from the displacement detector. To the non-inverting input terminal of operational amplifier 25 is applied a constant bias voltage by resistors $R_{10}$ and $R_{11}$. The other end of resistor $R_{11}$ is connected to the movable arm of a sliding resistor $VR_1$ so that the span of the current output may be set.

In the embodiment of the system shown in FIG. 3, operational amplifier 22 in control circuit 21 and resistors $R_4$, $R_5$, $R_6$ and $R_7$ therein constitute a subtractor, amplifier 23 being provided on the output side thereof. A modified form of control circuit 21 is shown in FIG. 5, in which a subtractor circuit is formed by resistors $R_4$, $R_6$ and $R_7$ and operational amplifier 22 and the reference value of the subtractor is supplied from a reference voltage source 24 via a resistor $R_{12}$. Since in all other respects the arrangement is exactly the same as in FIG. 3, no detailed description is necessary.

As will be appreciated from the foregoing description, in the present invention the relationship between pressure and an electrical output can be realized as a proportional relationship, even if use is made of a displacement detector 18 having a simplified structure. Accordingly, the present invention makes it possible to provide a pressure gauge at low cost which has its scale equally divided as in the conventional pressure gauge, thereby affording an easily interpreted read-out or display.

While the displacement converter has been described herein as being applied to a pressure gauge, it is to be understood that it is also applicable to other instruments such as a weighting gauge or the like.

I claim:

1. A displacement converter useful in pressure gauges and the like, the converter comprising:
   A. a displacement detector having a variable capacitor responsive to the displacement to be metered and a fixed capacitor insensitive thereto;
   B. an amplitude-controllable oscillator whose AC output is applied to both the variable and fixed capacitor;
   C. means coupled to the variable and fixed capacitors to derive therefrom first and second electrical signals which are a function of their respective capacitance values;
   D. a control circuit responsive to the first and second electrical signals to produce a control signal which depends on the difference therebetween; and
   E. means to apply said control signal to the oscillator to govern the output amplitude thereof in a manner maintaining the control signal at a constant level.

2. A converter as set forth in claim 1, wherein said detector includes a sensing diaphragm coupled to a movable electrode which is constituted by an annular plate whose periphery is attached by a resilient element to a metal ring concentric therewith, an insulation block disposed in parallel relation to said ring and said movable electrode, said insulation block having a first annular electrode thereon which faces said movable electrode to define said variable capacitor and a second annular electrode therein concentric with said first annular electrode and facing said ring to define said fixed electrode.

3. A converter as set forth in claim 2, wherein said first annular electrode has a marginal extension which faces said ring.

4. A displacement detector as set forth in claim 1, wherein said means coupled to said capacitors include a diode in series with a resistor connected to said variable capacitor to produce said first signal and a diode in series with a resistor connected to said fixed capacitor to produce said second signal.

5. A displacement converter as set forth in claim 4, further including a smoothing capacitor connected across each resistor.

6. A displacement converter as set forth in claim 5, wherein said control circuit includes an operational amplifier to whose input said first and said electrical signals are applied.

7. A displacement converter as set forth in claim 6, further including an amplifier coupled to the output of said operational amplifier to compare the output thereof with a reference voltage to produce said control signal.

* * * * *